G. G. BLUNT.
Grain-Drills.

No. 139,860.

Patented June 17, 1873.

WITNESSES:
Charles Meisner

INVENTOR:
George G. Blunt
per Herthel & Co
Attys.

UNITED STATES PATENT OFFICE.

GEORGE G. BLUNT, OF BATH, ILLINOIS, ASSIGNOR TO HIMSELF AND J. L. ASHURST, OF SAME PLACE.

IMPROVEMENT IN GRAIN-DRILLS.

Specification forming part of Letters Patent No. 139,860, dated June 17, 1873; application filed November 29, 1872.

*To all whom it may concern:*

Be it known that I, GEORGE G. BLUNT, of Bath, in the county of Mason and State of Illinois, have made a certain new and useful Improved Wheat and Seed Drill; and I do hereby declare that the following is a full and true description thereof, reference being had to the accompanying drawings and to the letters of reference marked thereon.

This invention consists mainly in the combination of certain parts whereby an economical and effective seed-drill is produced, as will be fully described hereinafter.

To enable others skilled in the art to make and use my invention, I will now more fully describe the same, referring to—

Figure 1:
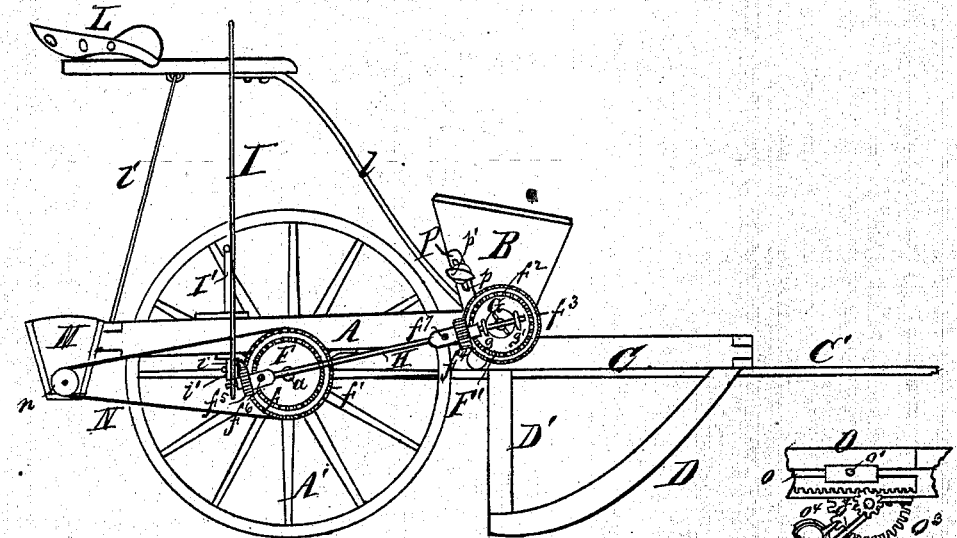
Figure 5:
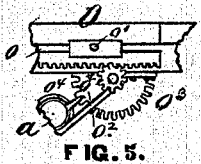
Figure 2:
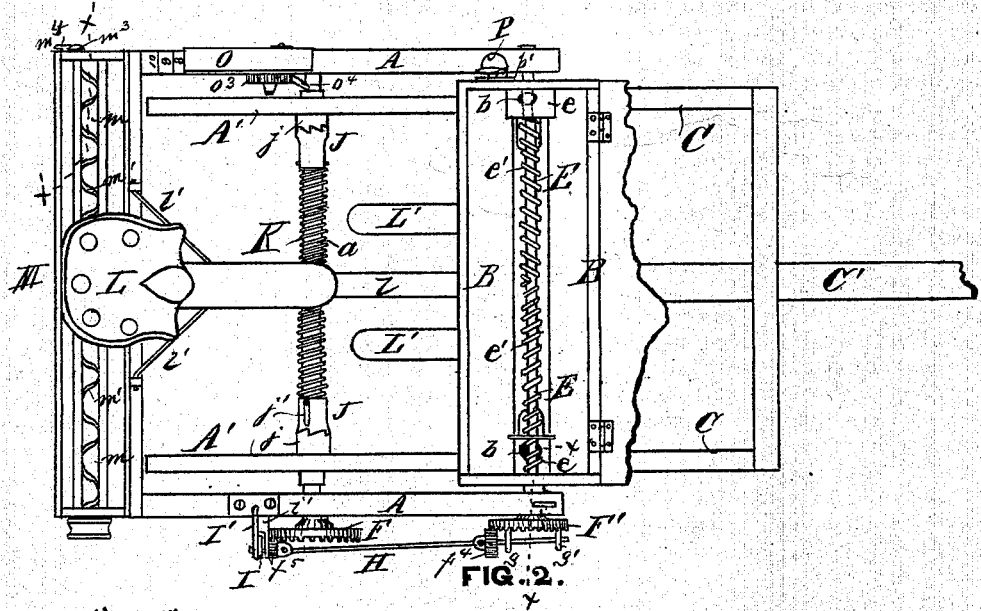
Figure 3:
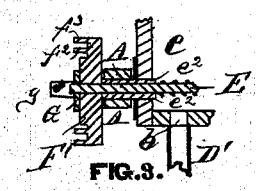
Figure 4:
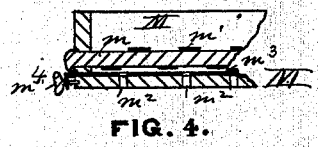

Figure 1 as a side elevation; to Fig. 2 as a top plan; to Fig. 3 as a detail section at line $x\,x$, showing hollow-shafting connection of feed-shaft to supporting-frame; to Fig. 4 as a detail sectional elevation with line $x'\,x'$ of Fig. 2; and to Fig. 5 as a detail side view of land-measurer.

A is the main frame; $a$, a driving-shaft operating in truss-journal bearings, secured to main frame. A', driving-wheels supported on shaft $a$. B is the seed-box, and attached to its bottom is the draft-frame C. C' is the tongue. D are the cutters or drills, and D' the seed-tubes. The seed-box B has its bottom (as well as the frame work attached to it) provided with seed-openings $b$, in line with the seed-tubes D'. In the seed-box B is arranged the feed-shaft E, supported to turn in the boxes $e$. Said feed-shaft has right and left blades or screws, $e^1$, which move or feed the grain through the boxes $e$ to the respective seed-tubes D, which are attached in line with the discharge-openings $b$ of the seed-box, and thus deposit the grain in the furrow made by the cutters. The seed feed devices above described are supported in a pivoted manner on the frame A; therefore the feed-shaft E has its outer ends turning in hollow shafts, $e^2$, which in turn are properly supported to turn in the forward part of the frame A. (See Figs. 2 and 3.) The seed-box, tubes, cutters, and draft frame attachments thus pivoted, independent of the action of the feed-shaft, can be better adjusted by the foot-power of the operator; and said devices can be further adjusted independent of the operation of the gearing devices that operate the said feed-shaft. The feed-shaft E is operated by the driving-shaft by the following gearing: To one end of the driving-shaft $a$ is keyed a crown-wheel, F, which is formed with an outer and inner circular row of cogs, $f\,f^1$. A similarly-constructed crown-wheel, F', having rows of cogs, $f^2\,f^3$, turns the feed-shaft E, being secured thereto by a collar, G, which, in turn, is properly secured to the end of said shaft E. The crown-wheels F F' mesh with the respective pinions $f^4\,f^5$, forming part of which are sleeves, in which engage set-screws $f^6\,f^7$, and by means whereof the said pinions can be shifted or relatively secured to a connecting-shaft, H, so as to gear with either the outer or inner row of cogs of said respective crown-wheels, F F'. One end of the connecting-shaft E turns in projecting lugs $g\,g'$, which form part of the collar G, the other end of said shaft turning in the lower end of a hand-lever, I, pivoted at $i$ in a bracket, $i'$, and which is properly bolted to main frame, A. The hand-lever I extends within operative reach of the driver's seat, and operates in a guide standard, I¹, secured to the top of frame A. Thus, from the power of the driving-shaft $a$, by arrangement of gearing aforesaid, a rotary motion is communicated to the feed-shaft E. Further, it will be noticed that the operator can regulate the variety of speed or feed-action of the feed-shaft E by adjusting and securing the pinions $f^4\,f^5$ to gear with either of the rows of cogs of the crown-wheels F F'. By means of the hand-lever I the operator can readily shift the pinions $f^4\,f^5$ in or out of gear. The arrangement of the driving-wheels loosely on the shaft $a$ is to obtain a free backward rotation of said wheels. In order, therefore, to cause the driving-wheels to operate the shaft $a$, the same is provided with coupling-boxes, J, which engage the coupling-ratchets $j$, formed on the inner side of the hubs of the wheels A'. (See Fig. 2.) The coupling-boxes J are slotted at $j'$, and are further limited in their lateral play by a pin. Further, enveloping the driving-shaft $a$ is a suitable spring, K; by force, therefore, of the said spring, the coupling-boxes J $j$ engaging each other, the shaft $a$ is rotated with its driving-wheels in their forward motion, and the rotary motion achieved drives the gearing, and is imparted to the feed-shaft E to do its feed-action.

A forward as well as backward rotation of driving-wheels and their shaft is readily had by throwing the gearing out of gear by the hand-lever.

The independent rotation of driving wheel or wheels and driving-shaft thus achieved greatly facilitates the turning of the machine, is easier in the working parts of the same, and greatly lessens the draft.

L is the driver's seat, secured by a spring-bar, $l$, to the bottom of the draft-frame, and connecting-rods $l'$ to the rear of main frame. L' are foot-rests secured to draft-frame. At rear of the machine is the following grass-sower: M represents a hopper. In said hopper is arranged to turn a screw-shaft $m$, formed with reverse-acting worm-threads, $m^1$. (See Figs. 2 and 4.) At bottom the hopper is provided with small openings, $m^2$, through which the seed is dropped. (See Fig. 4.) The screw-shaft $m$ is operated by means of belting, N, one part of which passes around the periphery of cog-wheel F, the other end around a pulley, $n$, secured to end of said screw-shaft. (See Fig. 1.) The rotation of the shaft $m$ feeds or moves the seed to and fro over and through the openings $m^2$.

In order to regulate the sowing action of the screw-shaft $m$, the bottom of the hopper is provided with a slide, $m^3$, which is correspondingly slotted to suit the bottom of said hopper; and said slide is operated laterally to open or close the openings or slots $m^2$, by means of a set-screw, $m^4$, which passes through the outer bent-down end of said slide and engages the side of the hopper, more clearly shown in Fig. 4.

To gage the depth of the cutters D, the seed-box must be relatively secured. To accomplish this, the sides of the seed-box are provided with adjusting-standards which are fitted to, abut, and rest against, the top of the main frame A.

A stop, $p$, is formed in each standard, in which a set-screw, $p'$, engages, and by means whereof said standard can be relatively secured to the side of the seed-box, as indicated in Figs. 1 and 2.

By simply raising and lowering and securing in adjusted position the standard P, the seed-box, together with its tubes, cutters, and draft-frame, can be readily positioned as regards the depth of gage for the cutters.

The required number of seed-tubes and cutters will have an equal number of seed-openings in box B, which will be partly covered, so that the screw-shaft operates the grain in opposite directions to the respective tubes.

Having thus fully described my invention, what I claim is—

The combination of the adjusting standards or slides P with the seed-box B, draft-frame C, and main frame, A, the standards being adapted to regulate the position of the draft-frame and seed-box relative to the main frame, as described.

In testimony of said invention I have hereunto set my hand in presence of two witnesses.

GEORGE G. BLUNT.

Witnesses:
   D. B. BEARDEN,
   R. P. GATTON.